United States Patent [19]
Miller

[11] Patent Number: 6,003,632
[45] Date of Patent: Dec. 21, 1999

[54] TREE STAND LADDER ADAPTER

[76] Inventor: Carlos Wayne Miller, 3028 Katherine-Valley Rd., Decatur, Ga. 30032

[21] Appl. No.: 09/160,738

[22] Filed: Sep. 25, 1998

[51] Int. Cl.$^6$ .................................................. A01M 31/00
[52] U.S. Cl. ........................................... 182/116; 182/187
[58] Field of Search ..................................... 182/116, 187, 182/20

[56] References Cited

U.S. PATENT DOCUMENTS

| | | | |
|---|---|---|---|
| 1,265,141 | 5/1918 | Trippe . | |
| 3,630,314 | 12/1971 | Bamburg . | |
| 5,016,732 | 5/1991 | Dunn | 182/116 |
| 5,253,732 | 10/1993 | Daniels | 182/116 |
| 5,267,632 | 12/1993 | Mintz | 182/116 |
| 5,282,520 | 2/1994 | Walker | 182/116 |
| 5,368,127 | 11/1994 | Phillips | 182/187 |
| 5,460,240 | 10/1995 | Jones | 182/116 |
| 5,532,063 | 7/1996 | Amacker | 182/116 |
| 5,564,524 | 10/1996 | Thaggoa et al. | 182/116 |
| 5,566,780 | 10/1996 | Bambrough | 182/116 |
| 5,655,623 | 8/1997 | Skyba | 182/116 |
| 5,791,436 | 8/1998 | Talley | 182/116 |

*Primary Examiner*—Alvin Chin-Shue
*Attorney, Agent, or Firm*—Joseph N. Breaux

[57] ABSTRACT

An adapter for converting a conventional ladder to a tree stand ladder which comprises a substantially flat horizontal platform having a pair of vertical connecting members extending downwardly and from one end of the platform, each connecting member has a port for receiving a top portion of the lateral members of a ladder with a ladder locking device forming a connection between the connecting members and the top portion of the lateral support members of the ladder. The other end of the horizontal platform is provided with a curved portion for mating with a tree or pole while a ratchet type locking strap is used to secure the tree stand ladder adapter along with a ladder to a tree or pole while a second securing strap is provided near a lower or middle part of the ladder securing a middle or lower portion of the ladder to the tree if desired.

1 Claim, 2 Drawing Sheets

TREE STAND LADDER ADAPTER

TECHNICAL FIELD

The present invention relates to devices and methods for tree stands and more particularly to devices and methods for a tree stand ladder adapter that converts a conventional extension ladder into a tree stand suitable for hunting, tree trimming, or picking fruit. The adapter comprises a substantially flat horizontal platform having a pair of connecting members extending downwardly and vertically from one end of the platform. Each connection member is channeled forming a port for receiving the lateral members of the ladder and a frictional locking device for securely correcting between the connecting member and the ladder. The opposite end of the platform is provided with a curved mating end for resting against the tree or post, while a ratchet type locking strap extends from the curved end corners so that the tree stand can be secured around the tree. A second strap is provided for securing a middle or lower portion of the ladder to the tree if desired.

BACKGROUND ART

There are numerous ladders in the prior art which have members designed to strap to a tree. These prior art devices are extremely useful for there stated purposes, however prior to the present invention there has never been an adapter which converts a conventional ladder to a tree stand ladder. Accordingly, the present invention can be utilized with a user's existing ladder which saves money and time for the user.

The prior art patents which describe tree stand ladders are as follows:

Bambrough, U.S. Pat. No. 5,566,780 describes a ladder-based cart apparatus with a ladder assembly supported by a pair of wheels and a platform assembly for strapping the ladder-based cart assembly to a tree.

Thaggard, et al, U.S. Pat. No. 5,564,524 which discloses a folding ladder tree stand comprising a ladder with a runged upper section for coupling and aligning a ladder to a tree.

Phillips, U.S. Pat. No. 5,368,127 discloses a compact portable tree stand with an elevated platform and a means for connecting the stand to a tree.

Amacker, U.S. Pat. No. 5,332,063 discloses a ladder stand with a platform and a pair of jaws positioned so that the platform can be safely secured to a tree before the ladder is climbed.

Walker, U.S. Pat. No. 5,282,520 discloses a portable hunting stand with a game carrier which includes a ladder element with a seat platform located on the upper ladder element including a tree attaching element.

As can be seen from the prior art there are numerous useful tree stand ladders which have various attachments and orientations for specific uses. These prior art devices do not provide a adapter which converts a conventional ladder to a tree stand as the present invention and which can be easily and quickly attached or detached from the ladder if desired.

GENERAL SUMMARY DISCUSSION OF INVENTION

It is thus an object of the invention to provide a Tree Stand Ladder Adapter that converts a conventional ladder to a tree stand ladder.

It is a further object of the invention to provide a Tree Stand Ladder Adapter that is attachable to a top end of the lateral extension of a conventional ladder and converts the conventional ladder to a ladder tree stand.

It is a still further object of the invention to provide a Tree Stand Ladder Adapter that converts a conventional ladder to a ladder tree stand and includes a tree securing strap which wraps around a portion of the tree trunk and secures the ladder stand in position.

It is a still further object of the invention to provide a Tree Stand Ladder Adapter that comprises a substantially flat horizontal rectangular platform having a pair of vertical connecting members extending downwardly from one end therefrom, each connecting member is channeled to form a port for receiving a top portion of the lateral members of a ladder while a frictional locking device is positioned on each connecting member and used to form a frictional connection between the connecting members and the top end of the lateral ladder support. The opposite end or the platform is provided with a curved tree mating member with a ratchet type locking strap extending from the curved end corners and that can be secured around the tree to secure the stand to the tree. A second strap can be provided for securing a middle or lower portion of the ladder to the tree if desired.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

It can be seen from the following description that in use a user would insert a top portion of the lateral ladder members into the connecting members of the tree stand ladder adapter. The connecting member includes frictional securing means which would then be engaged and thus locking the connecting members to the top portion of the lateral members of the ladder. The ladder, along with the connected tree stand ladder adapter would then be lifted into place against the tree or pole to be climbed. After adjusting the ladder to the desired height, the user would wrap the bottom support strap around the base of the tree or pole and tighten it using the ratcheting tightening device. After securing the bottom support strap, the same procedure would be repeated with the top support strap thus firmly securing the ladder along with the tree stand ladder adapter to a tree or pole. The user would now have a stable horizontal platform useful for hunting, tree maintenance, or even picking fruit from trees.

Figure 1:
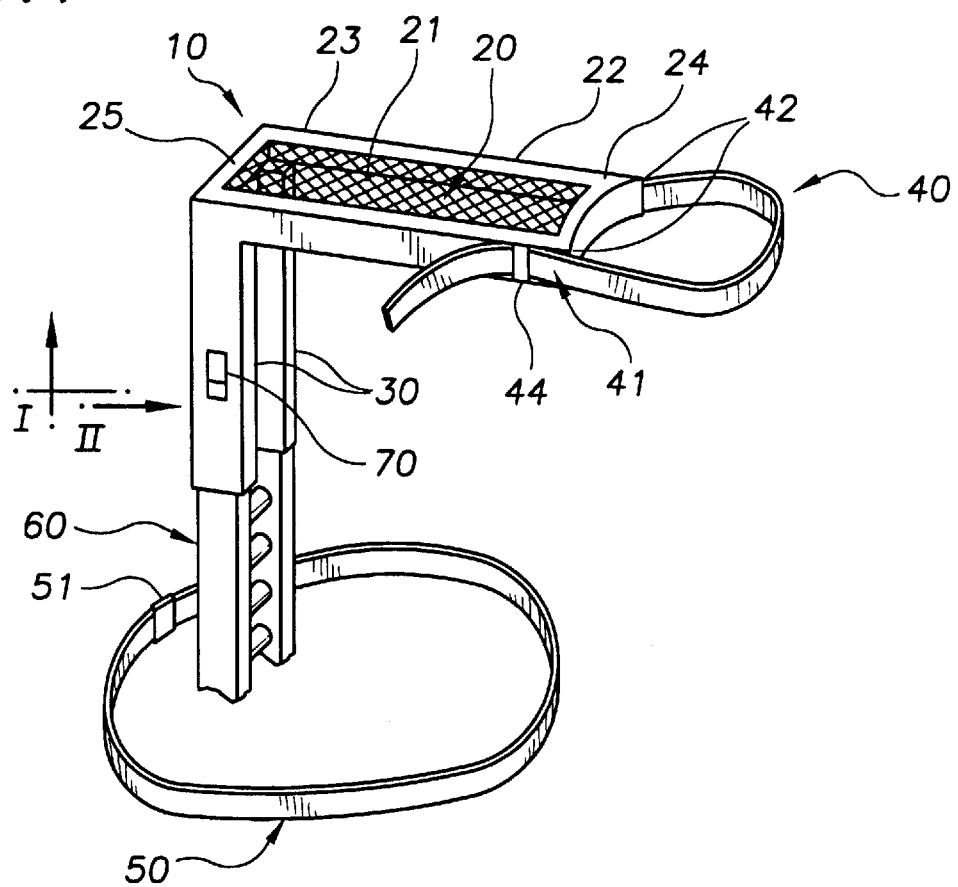
FIG. 1 is an isometric view of the tree stand ladder adapter attached to a ladder and illustrating the horizontal rectangular framed platform, a pair of connecting members, ratchet type locking strap, and second strap for securing the middle portion of the ladder to a tree.
Figure 2:
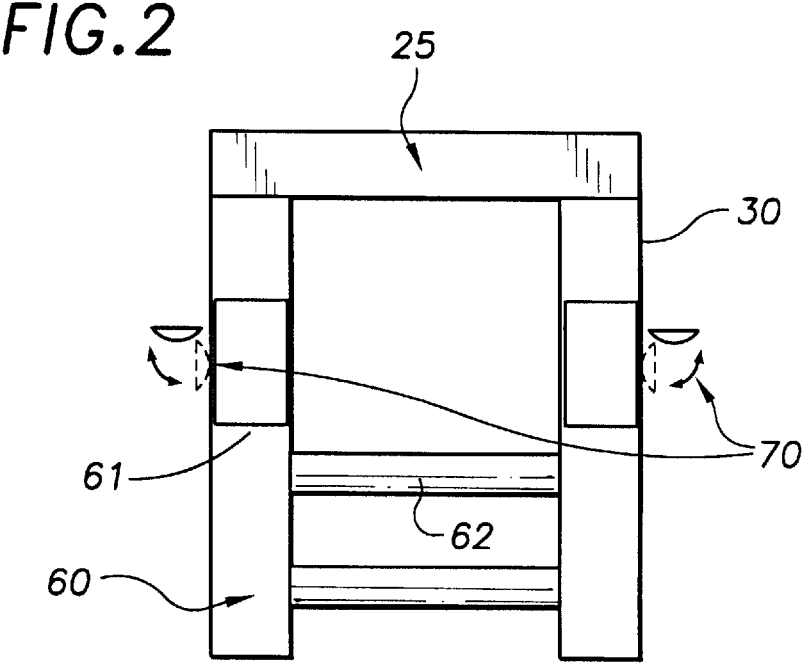
FIG. 2 is a front view of the tree stand ladder adapter attached to a top portion of the lateral members of a conventional ladder illustrating the connecting member securing means forming a frictional connection between the pair of connecting members and the top portion of the lateral members of the conventional ladder.

Referring to the figures in detail, FIG. 1 is an isometric view of the tree stand ladder adapter 10 attached to a conventional ladder 60 which illustrates the main features including the horizontal rectangular framed platform 20, the pair of vertical connecting members 30, the top securing strap 40, and the bottom securing strap 50. The tree stand ladder adapter 10 is manufactured of light weight material such as aluminum, so that it may be easily carried, and is in a shape of an inverted "L" with the long part of the "L" serving as the horizontal rectangular platform 20, while the shorter part of the "L" is the two connecting members 30 extending vertically from one end of the horizontal platform 20. The two connecting members 30 are hollow to allow them to fit over the top end of the lateral members 61 of a ladder. The horizontal rectangular platform 20 is preferably constructed of frame members forming a rectangular frame with a meshed center portion 21. The rectangular frame 22 includes two elongated side members 23, a curved tree mating front member 24 which has a curvature to receive a tree or post, and a back member 25. The frame members are welded together and the center meshed area 21 is similarly welded to the frame members. Two connecting members 30 extend vertically and downwardly from the back end member 25 of the horizontal platform 20. The connecting members 30 are channeled provide a receiving port 31 for connecting the tree stand ladder adapter 10 to a conventional ladder. The connecting members 30 include an internal channel 31 that extends from an open end 32 of each connecting member to the top end 33 of the connecting member. The connecting members each also have a ladder top rung channel 34 for allowing the top rung 62 of a ladder 60 to travel into the connecting member 30. The ladder top rung channel 62 terminates at stop 35 which prevents the ladder from being inserted in the channel any further so that the weight of the tree ladder stand rest on the top rung 62 of the ladder.

Figure 3:
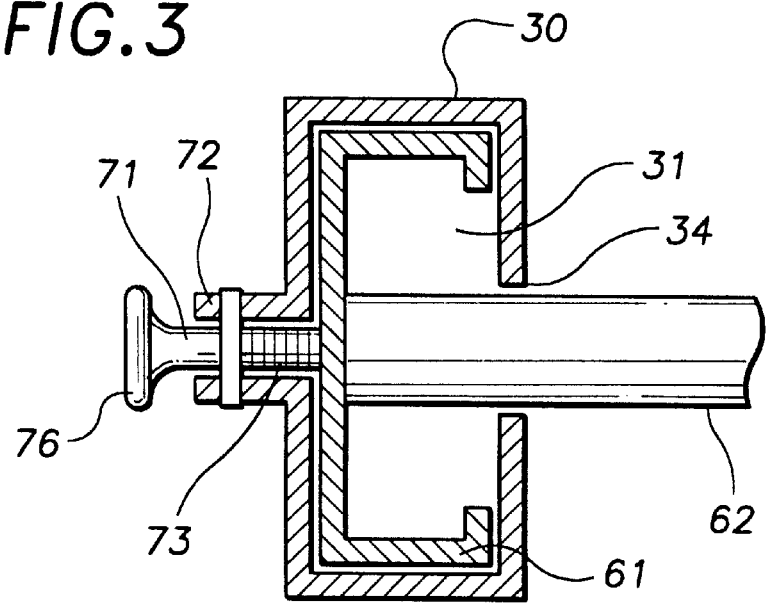
FIG. 3 is a cross sectional view taken along line I of FIG. 1 illustrating the connecting member securing means which is frictionally securing a top portion of the lateral ladder member in one of the connecting members.
Figure 4:
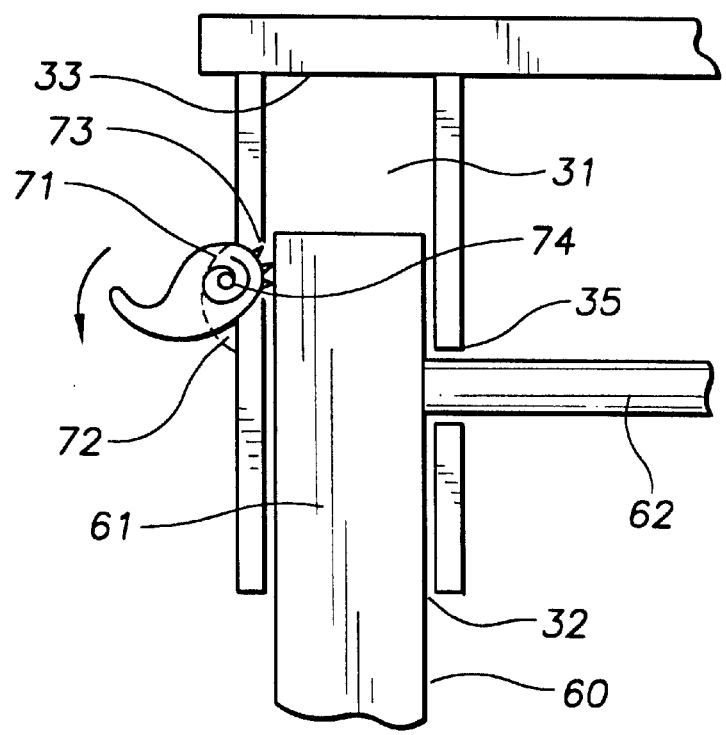
FIG. 4 is a cross sectional view taken along line II of FIG. 1 illustrating the placement of a top portion of a lateral ladder member in a connecting member with a connecting member securing means.

A connecting member securing means 70 is positioned on each connecting member on an outside portion of the connecting members. The securing means 70 are illustrated in detail in FIGS. 3 and 4. The securing means preferably operate passively, that is, the securing means require no action on the part of the user to assure that they are locked into position, this will assure that the tree stand is securely attached even when a user may inadvertently forgot to check the securing means engagement. The securing means 70 preferably includes an offset pivoting cog 71 which is pivotally mounted between mounting tabs 72. The pivoting cog 71 rotates a frictional engagement portion 73 into the channel area 31 and into contact with the inserted ladder whereby the frictionally engaging the ladder and preventing the ladder from being withdrawn from the channel area 31. When the cog 71 is pivoted in the direction shown in FIG. 4, the cog 71 will disengage from the ladder and allow the ladder to be withdrawn from the channel area 31. A spiral spring 74 urges the pivoting cog to rotate in the opposite direct indicated in FIG. 4 and engage with the inserted ladder, therefore a user is only required to insert the ladder into the channels until the ladder top rung contacts stop 35 and the securing means 70 will automatically secure the ladder in position. In order to release the ladder from the securing means 70 a manual tab 76 is provided so that a user may rotate the cog away from frictional engagement with the ladder.

The top securing strap 40 is connected to each corner 42 of the curved end 24. The securing strap 40 preferably includes a quick disconnect buckle 41 and a ratcheting strap tightening means 44 which allows the strap to be quickly wrapped around a tree and ratcheted tightly around the tree drawing the curved end 24 against the tree. A bottom securing strap 50 is also provided near the middle or bottom portion of the ladder and similarly includes a quick release buckle 51 while the strap 50 is substantially longer than the top strap 40. The bottom strap functions to prevent the ladder from being displaced laterally.

It is noted that the embodiment of the Tree Stand Ladder Adapter described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A tree stand ladder adapter attachable to a round object for converting a ladder having two spaced lateral members secured together and spaced by a number of ladder rungs and a top portion and a bottom end into a tree stand, said tree stand ladder adapter comprising:

a) a horizontal rectangular framed platform comprising frame elements forming two long sides, a curved mating end for resting against a round object such as a tree, a back end, and a top surface comprising grated material placed between frame elements, b) a pair of ladder connecting members extending vertically and downwardly from said back end of said horizontal framed platform, said connecting members are each channeled to form a port for receiving a top portion of the lateral members of the ladder, said ports formed by said channeled connecting members have a securing means that grips the top portion of the ladder while said securing means is biased to grip the top portion of the ladder and prevent the top portion of the ladder from being withdraw from said port until a user manually disengages said securing means to remove the top portion of the ladder from said port, said connecting members are positioned in relation to each other to enable them to align with the lateral members of the ladder, when the top portion of the ladder is inserted into connecting members one of the number of ladder rungs extends between said connecting members to provide a stepping location for a user to step from the ladder onto said horizontal framed platform, c) a top securing strap extending from each corner of said curved mating end of said horizontal framed platform and used to strap around a round object that said curved mating end rest against, said strap comprising a quick release buckle and a ratcheting means to tighten said strap and to pull said curved mating end into contact with said round object, and d) a lower securing strap releasably positioned near a bottom end of the ladder and used to secure the ladder near a bottom end of the round object, said lower strap comprises a quick release buckle;

said connecting member securing means further comprising a pivoting engagement cog installed on each connecting member which pivots to enter a portion of said channel and contact the top portion of the ladder inserted into said channel, said engagement cog includes an offset pivot which enables the top portion of the ladder to be inserted into said channel without engaging said engagement cog and wherein said engagement cog pivots to frictionally engage the top portion of the ladder when the top portion of the ladder begins to move out of said channel, said engagement cog includes a spiral spring which urges said engagement cog to pivot toward engagement with the top portion of the ladder and a frictional ladder engagement surface on said engagement cog, and a manual release tab used to manually pivot said friction ladder engagement surface away from the inserted top portion of the ladder so that the top portion of the ladder can be removed from said channels.

* * * * *